(12) United States Patent
Taylor

(10) Patent No.: US 7,290,425 B2
(45) Date of Patent: *Nov. 6, 2007

(54) GRIPPING APPARATUS AND METHOD

(75) Inventor: Craig E. Taylor, Benton, KS (US)

(73) Assignee: The Boeing Company, Chicago, IL (US)

( * ) Notice: Subject to any disclaimer, the term of this patent is extended or adjusted under 35 U.S.C. 154(b) by 133 days.

This patent is subject to a terminal disclaimer.

(21) Appl. No.: 11/111,875

(22) Filed: Apr. 22, 2005

(65) Prior Publication Data

US 2005/0247099 A1 Nov. 10, 2005

Related U.S. Application Data

(63) Continuation-in-part of application No. 10/838,246, filed on May 5, 2004, now Pat. No. 7,069,761.

(51) Int. Cl.
B21D 25/04 (2006.01)
B23B 31/12 (2006.01)

(52) U.S. Cl. ............... 72/302; 269/217; 269/234; 279/60

(58) Field of Classification Search ............... 72/302, 72/296, 297, 291, 311; 279/4.08, 60–65, 279/2.12; 269/138, 217, 234
See application file for complete search history.

(56) References Cited

U.S. PATENT DOCUMENTS

| | | | | |
|---|---|---|---|---|
| 2,696,987 A | * | 12/1954 | Smith, Jr. et al. ............. | 279/60 |
| 3,416,350 A | | 12/1968 | Eagleson et al. ............. | 72/293 |
| 3,566,664 A | * | 3/1971 | Schweizer ................... | 72/402 |
| 3,933,020 A | * | 1/1976 | Orr et al. ...................... | 72/297 |
| 4,188,683 A | * | 2/1980 | Klunder ................... | 15/104.33 |
| 4,541,465 A | * | 9/1985 | Leadbeatter ................. | 142/55 |
| 5,086,636 A | | 2/1992 | Huet ............................ | 72/296 |
| 5,606,886 A | | 3/1997 | Polen ........................... | 72/296 |
| 5,771,730 A | | 6/1998 | Huet .............................. | 72/58 |
| 6,109,089 A | | 8/2000 | Farney et al. ................ | 72/422 |
| 6,843,485 B2 | * | 1/2005 | Sakamaki et al. ............ | 279/62 |
| 6,880,832 B2 | * | 4/2005 | DeRosa ....................... | 279/44 |

OTHER PUBLICATIONS

Missouri Metals, Shaping Tomorrow Today, "Stretch Wrap," p. 1.
Cyril Bath Company, "Stretchforming Extrusion Process," p. 1.

* cited by examiner

Primary Examiner—Daniel C Crane
(74) Attorney, Agent, or Firm—Baker & Hostetler LLP

(57) ABSTRACT

A quick change gripping apparatus for gripping a workpiece having a profile. The apparatus includes a cylindrical housing having a first end and a second end. The cylindrical housing also includes an inner feature having a tapered wall. The housing also has a bottom section and a clam shell section that is hingedly connected to the bottom section. The quick change gripping apparatus also includes a first ring and a second ring, each disposed around the cylindrical housing.

22 Claims, 8 Drawing Sheets

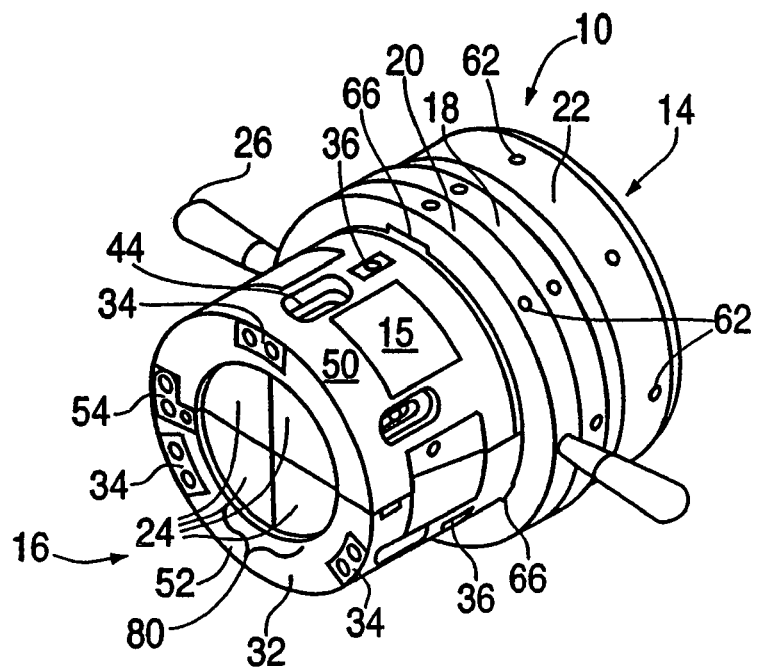
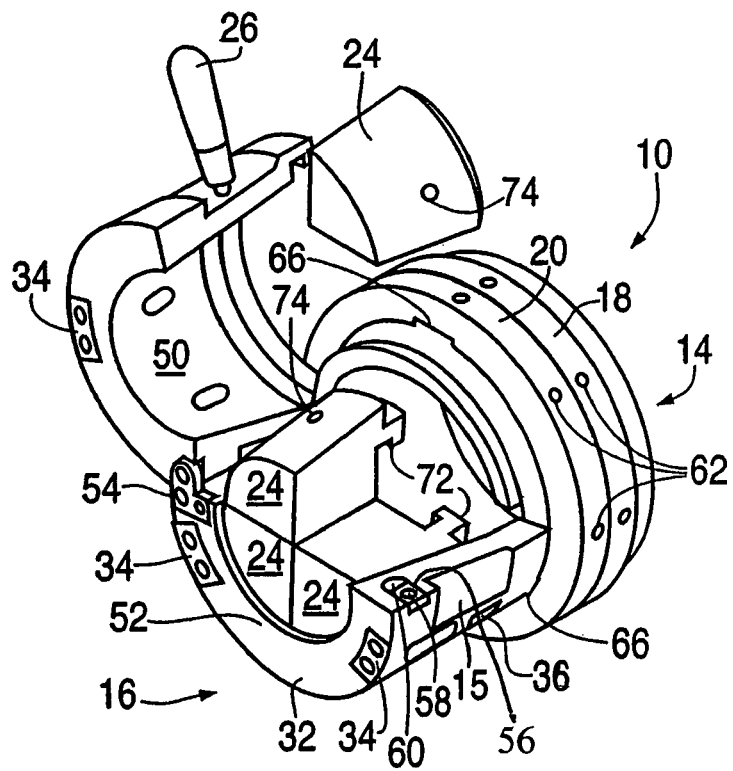

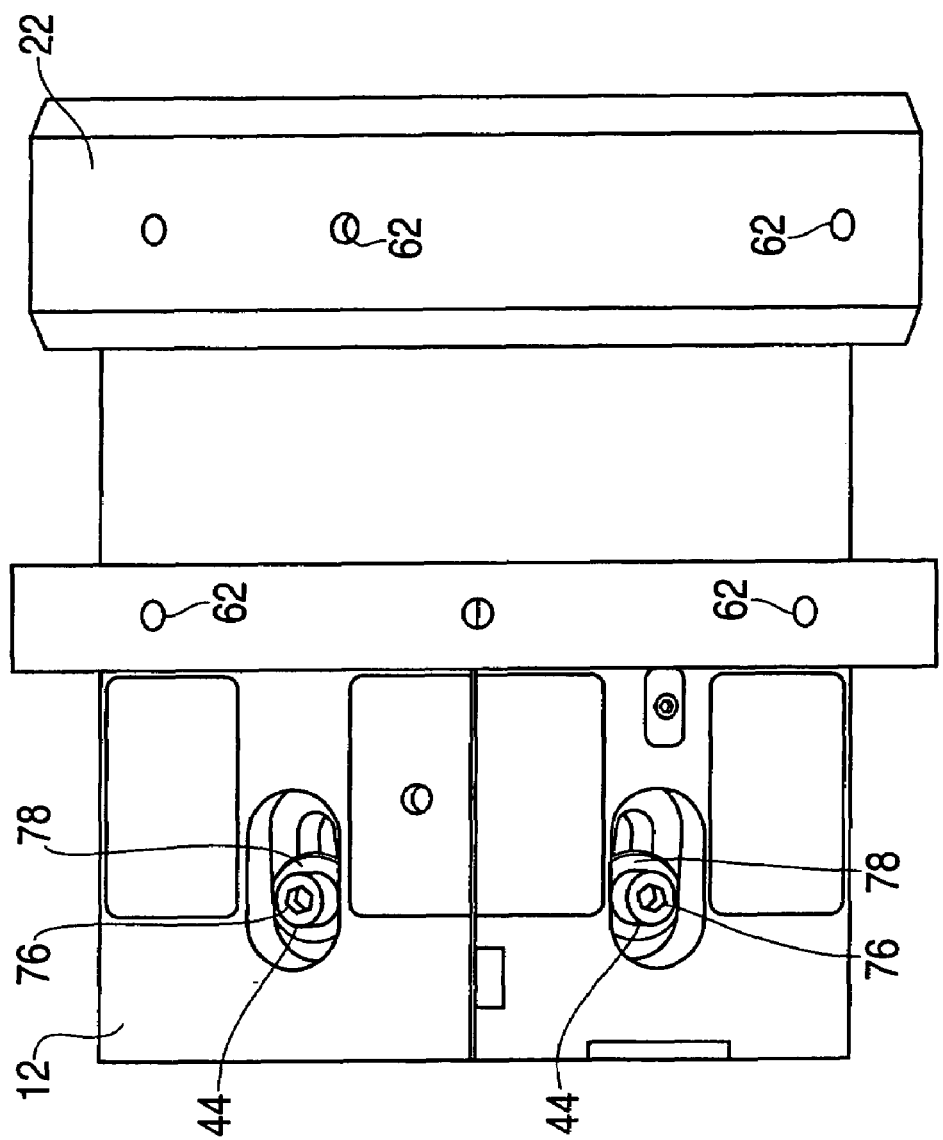

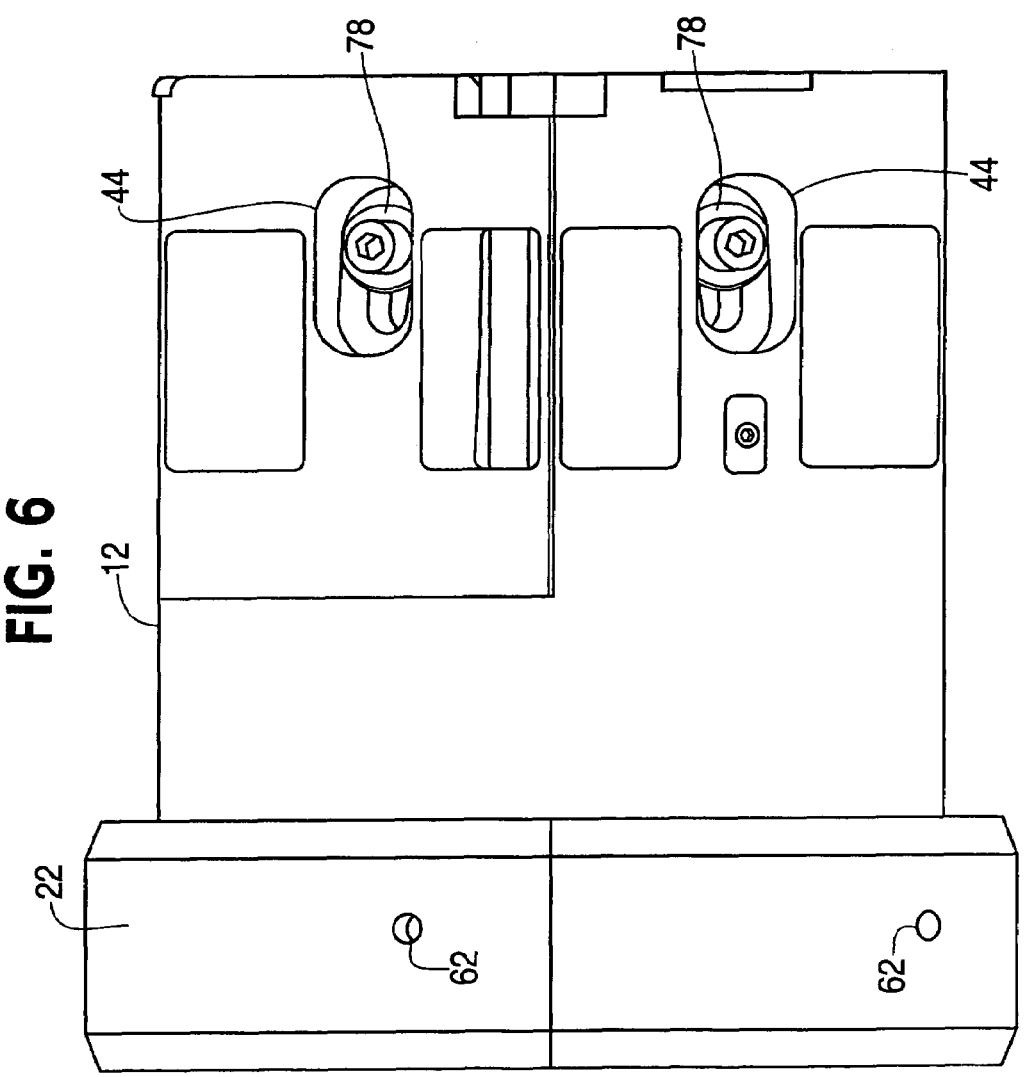

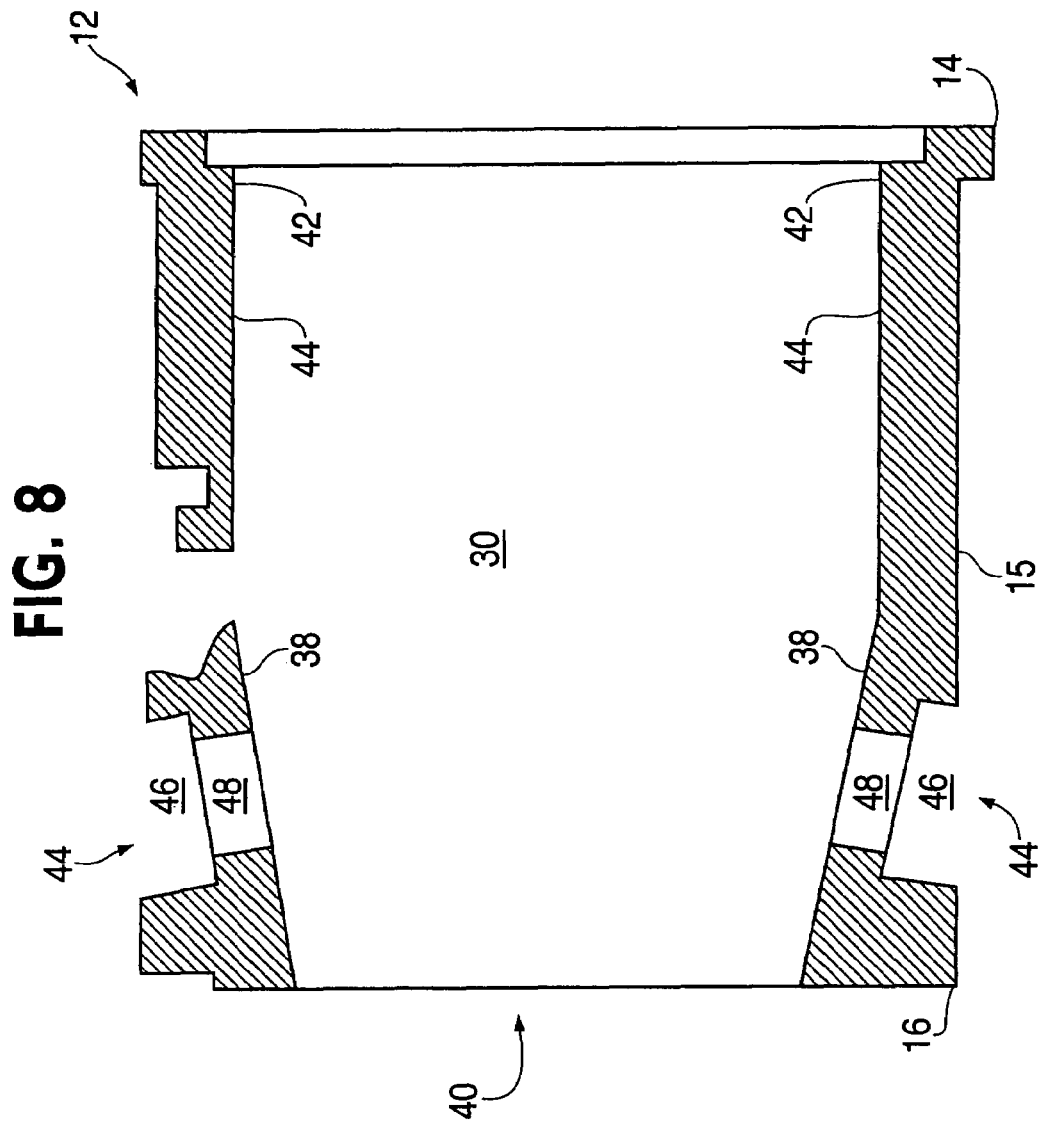

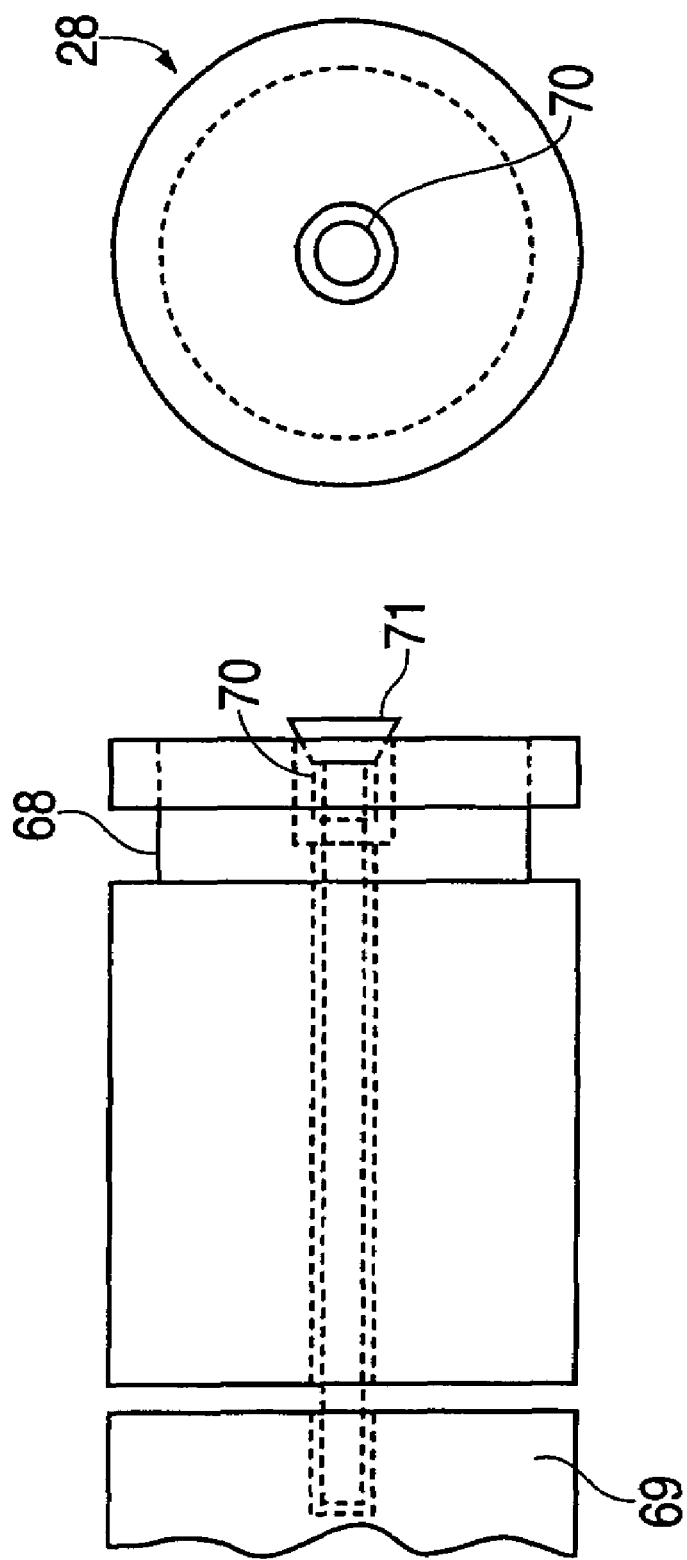

GRIPPING APPARATUS AND METHOD

CLAIM OF PRIORITY

This application is a continuation-in-part, and claims the benefit of, U.S. patent application Ser. No. 10/838,246 filed May 5, 2004, now U.S. Pat. No. 7,069,761 entitled GRIPPING APPARATUS AND METHOD, the disclosure of which is incorporated herein by reference.

TECHNICAL FIELD

The present disclosure relates generally to the manufacturing of components and/or workpieces, such as for example via stretch forming. More particularly, the present disclosure relates to an apparatus and method for gripping and/or grasping workpieces. Even more particularly, the present invention relates to extrusion stretch jaws, or the like, for gripping workpieces having a variety of configurations for stretch forming or other manufacturing process for use in combination with a stretch-wrap machine or the like.

BACKGROUND

In a variety of manufacturing processes, it is necessary to grip or hold a workpiece and/or component to enable an operation or work to be performed on the workpiece or component. For example, one such operation is stretch forming which employs a stretch-wrap machine or the like.

Stretch forming is a process for forming contoured metal parts or workpieces by pulling and wrapping extrusions around a die. During the stretch forming process, the workpiece is typically gripped at opposite ends using a pair of gripping devices of the stretch-wrap machine. The gripping devices are then moved apart to apply tension to the workpiece. The tensioned workpiece is then bent around a forming member or die to form a desired shape.

During the stretch forming process, the stress on the workpiece becomes so great that the metal reaches a state of semi-plasticity. This occurs by stretching the workpiece beyond its yield point. Metal structures undergoing such deformation, upon release of the tension, remain permanently deformed. This permanent deformation of the metal causes the workpiece to remain the desired shape into which it was formed during the stretch wrap process.

One approach currently employed for gripping and holding a workpiece for stretch forming, is to fabricate a set of complementary jaws that correspond to each configuration of workpiece that is to be gripped. Typically, several jaw insert segments collectively make what is referred to as the jaw insert. These insert segments are placed into a housing or sleeve, generally known as a jaw head or insert chamber, and fit together and define at their adjoining, axially-extending surfaces a profile, i.e., the cross-section, of the workpiece to be stretch formed. In the above-described gripping device and method, the jaw inserts must be precisely manufactured to a relatively exact shape which compliments that of the workpiece, in order to enable the jaw head and jaw inserts to function properly. Therefore, as a consequence, each unique configuration of each workpiece to be gripped and subsequently stretched, requires its own set of dedicated jaw inserts.

Thus, the aforementioned approach to stretch forming has drawbacks. Whenever a workpiece having a different profile is to be formed, the jaw inserts must be changed. Also, if a substantial number of different workpiece configurations or profiles are to be worked on, it can become quite expensive to fabricate and maintain the required inventory of jaw insert sets. Moreover, the changing of jaw inserts in response to different profiles of workpieces requires that the jaw head or gripper assembly be disassembled and removed by the operator. The aforementioned disassembly and removal can be very laborious and fatiguing considering the gripper assemblies can be very heavy, oftentimes weighing 120 lbs or more. Also, the exchanging of jaw inserts can be very time consuming, causing the manufacturing process to be inefficient to some extent.

Another approach for gripping a workpiece that is currently employed in the art is to install a "gripper jaw" in the jaw portion of the stretch former that has a shape that is generally complementary to that of the workpiece. In this approach, the workpiece is subsequently modified in shape in the area to be gripped to match the shape of the gripper jaw. This approach, however, has drawbacks also, because it adds considerable time to the manufacturing process for the workpiece while it also requires modifications to the workpiece in many instances that are oftentimes undesirable. In some instances, the requisite modifications to the workpiece may result in the modifications being transferred to other areas of the workpiece during manufacturing operations, causing the workpiece to become flawed.

Accordingly, there is a need in the art to provide an apparatus and method that allows for the efficient manufacture of workpieces having various configurations, using stretch forming processes and the like. Further, there is a need in the art that allows for the ease of removal or exchange of jaw inserts of a jaw head or the like, that is ergonomic and less fatiguing.

SUMMARY

The foregoing needs are met, to a great extent, by the present disclosure, wherein a gripping apparatus and method are provided. An embodiment is comprised of a cylindrical housing having a first end and a second end. The cylindrical housing includes an inner feature having a tapered wall wherein the inner feature extends at least partially between the first end and the second end. The housing also includes a first half shell affixed to the inner feature and a second half shell pivotally connected to the first half shell that is pivotal between an open position and a closed position. The gripping apparatus further comprises a first ring having a circumference slidably disposed around the cylindrical housing at a first axial location thereof, wherein the first ring translates a first distance along the housing.

In accordance with another embodiment, a gripping apparatus is provided comprising a means for inserting a first jaw insert and a second jaw insert into a cylindrical housing wherein the housing has a first end and a second end. The housing includes an inner feature having a tapered wall wherein the tapered wall extends at least partially between the first and second end. The apparatus also includes a first half section rigidly connected to the inner feature and a second half shell section pivotally connected to the first half shell. The apparatus further includes a first ring having a circumference that is slidably disposed around the housing and second ring having a circumference slidably disposed around the housing. The apparatus also comprises a means for closing the second half shell section and retaining the second half shell section to the first half shell section. The apparatus further comprises a means for translating the first ring in a first direction along the housing until it abuts a stop and a means for translating the second ring in the first direction until it abuts a stop. The apparatus includes a means for applying a pushing force in the first direction to the jaw inserts, causing the inserts to wedge against the tapered wall. Finally, the apparatus includes a means for trapping the workpiece between the jaw inserts.

In accordance with still another embodiment, a stretch form machine is provided for stretch forming a workpiece or the like. The stretch form machine comprises an inner hydraulic drive and an outer hydraulic drive. The machine also includes at least a first gripping apparatus the grips the workpiece. The gripping apparatus comprises a cylindrical housing having first and second ends and an inner feature having a tapered wall, wherein the sleeve extends at least partially between the ends. The gripping apparatus also includes a first half shell section and a second half shell section hingedly connected to the first half shell section. The stretch form machine also includes a first ring having a circumference that is slidably disposed around the cylindrical housing. The ring translates a first distance along the housing. The machine further includes a first jaw insert and a second jaw insert each positioned within the sleeve.

In accordance yet another embodiment, a method for gripping a workpiece using a gripping apparatus is provided, comprising the steps of: inserting a workpiece to be into the gripping apparatus, wherein the gripping apparatus comprises: a first jaw insert and a second jaw insert disposed within a cylindrical housing having a first end and a second end wherein the cylindrical housing comprises: an inner feature having a tapered wall, wherein said tapered wall extends at least partially between the first end and the second end; a first shell rigidly affixed to the inner feature; a second half shell pivotally connected to the first half shell; a first ring having a circumference slidably disposed around the cylindrical housing at a first axial location thereof; and a second ring having a circumference slidably disposed around the cylindrical housing at a second axial location thereof; applying a pushing force in a first direction to the first and second jaw inserts, wherein said step of applying a pushing force causes the first and second jaw inserts to wedge against the tapered wall; and trapping the workpiece between the first and second jaw inserts.

In accordance still another embodiment, another method for gripping a workpiece using a gripping apparatus is provided, comprising the steps of: inserting a first jaw insert and a second jaw insert into a cylindrical housing having a first end and a second end wherein the cylindrical housing comprises an inner feature having a tapered wall, wherein said tapered wall extends at least partially between the first end and the second end; a first half shell rigidly to the inner feature; a second half shell pivotally connected to the first half shell; a first ring having a circumference slidably disposed around the cylindrical housing at a first axial location thereof; a second ring having a circumference slidably disposed around the cylindrical housing at a second axial location thereof; closing the clam shell section and retaining the clam shell section to the bottom section; translating the first ring a first direction along the housing until it abuts a first stop; translating the second ring in the first direction along the housing until it abuts a second stop; applying a pushing force in the first direction to the first and second jaw inserts, wherein said step of applying a pushing force causes the first and second jaw inserts to wedge against the tapered wall; and trapping the workpiece between the first and second jaw inserts.

There has thus been outlined, rather broadly, certain embodiments in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The embodiments may be practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

BRIEF DESCRIPTION OF THE DRAWINGS

FIG. 3 is an isometric view of the quick change gripping apparatus illustrated in FIGS. 1 and 2 in the non-operational position.

FIG. 4 is an isometric view of the quick change gripping apparatus in the non-operational position as depicted in FIGS. 1-3, with the clam shell section open.

FIG. 5 is a detailed, right side view of the quick change gripping apparatus.

FIG. 6 is a detailed, left side view of the quick change gripping apparatus.

FIG. 8 is a detailed, sectional view of a housing employed in the quick change gripping apparatus.

FIG. 9 is a side view of a ram extension component that is utilized with the quick change gripping apparatus.

FIG. 10 is a from view of the ram extension component depicted in FIG. 9.

DETAILED DESCRIPTION

Figure 1:
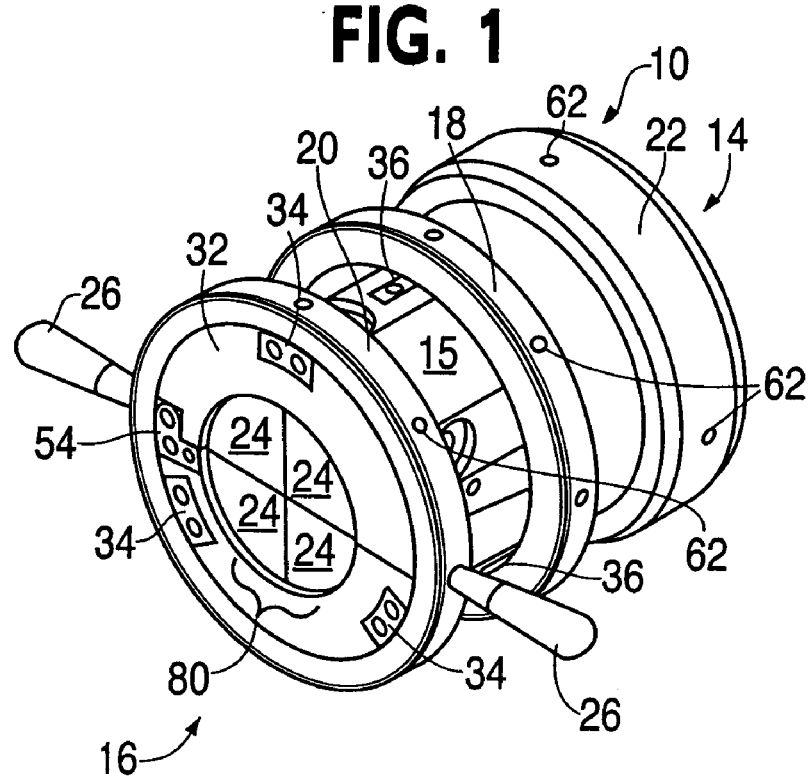
FIG. 1 is an isometric view of a quick change gripping apparatus in an operational position in accordance with an embodiment.

Various preferred embodiments provide for a quick change gripping apparatus and method for gripping and stretching workpieces, for use during extrusion processes such as stretch forming or the like. In some arrangements, the apparatus and method are utilized in combination with a stretch former or stretch-wrap machine. It should be understood, however, that the present disclosure is not limited in its application to stretch formers or strap-wrap machines or even extrusion processes, but, for example, can be used with other machines and/or with other manufacturing processes that require the gripping or grasping of workpieces or components. Preferred embodiments will now be further described with reference to the drawing figures, in which like reference numerals refer to like parts throughout.

Figure 7:
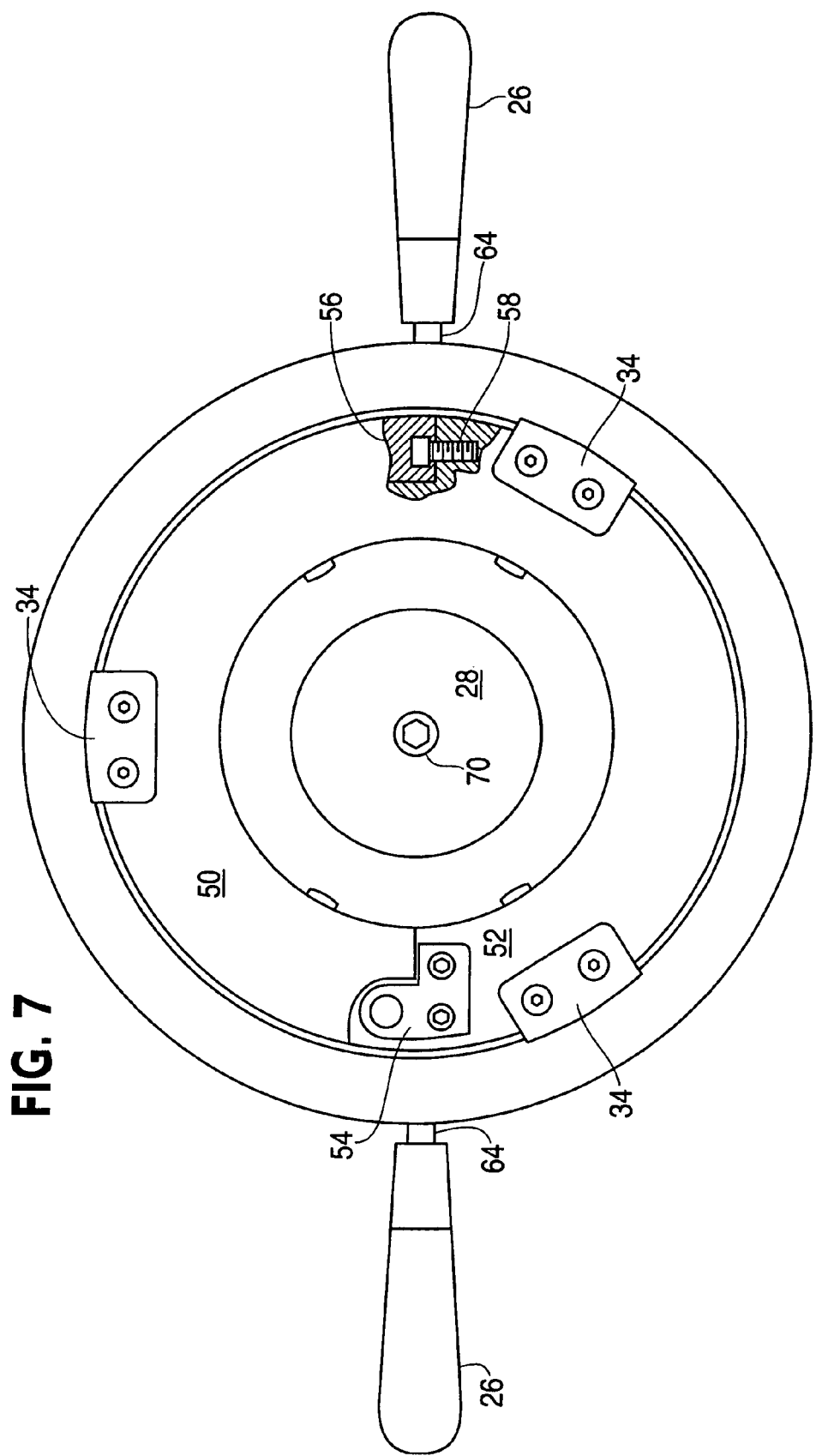
FIG. 7 is a detailed front view of the quick change gripping apparatus.

Referring now to FIGS. 1-4, a quick change gripping apparatus, generally designated 10, is illustrated in accordance with an embodiment. The quick change gripping apparatus 10 includes a housing 12 having a first or rear section 14, a middle section 15 and a second or front section 16. The quick change gripping apparatus 10 also includes a series of retaining means such as for example rings, collars, or sets of half-shells, for example, comprising a rear ring 18, a front ring 20 and a retainer ring 22, that each surround or encircle a portion of the housing 12 at an axial location thereof. The quick change gripping apparatus 10 is also used in combination with a plurality of jaw inserts, each designated 24, and each removably disposed within the housing 12. As illustrated in FIGS. 1-4, the apparatus has a handle assembly having two handles, each designated 26, that engage the respective rings 18, 20, 22. Also, as illustrated in FIGS. 7, 9 and 10, the gripping apparatus 10 includes a ram extension 28, that during operation of the apparatus, is disposed within the housing 12 behind the jaw inserts 24.

Again, referring to FIGS. 1-4 and now, additionally to FIGS. 5-8, the housing 12 is preferably cylindrical in shape and orientation, and defines an angular, inner feature 30. As illustrated in FIGS. 1-4, the second end 16 is the front end 16, which is the gripping end of the housing 12 and has a circular face, generally designated 32. The housing 12 also includes three front stops 34, positioned about the circumference of the face 32, equally spaced apart from one another. The front stops 34 are preferably positioned approximately 120 degrees apart from one another. The front stops 34 function to stop the translation of the front ring 20. Also as illustrated in FIGS. 1-6, the housing 12 additionally includes a series of rear stops 36 positioned about the circumference of the middle section 15 of the housing 12 equally spaced apart from one another. Like the front stops 34, the rear stops 36 are preferably positioned approximately 120 degrees apart from one another. The rear stops 36 function to stop the translation of the rear ring 18.

The inner feature 30 of the housing 12 includes a inner, tapered wall 38 as it extends to the front end 16. As the tapered wall 38 extends to the front end 16, it extends at an angle, for example 20 degrees, and to an opening 40 where the apparatus 10 engages the workpiece or component to be gripped or grasped. As the housing 12 extends from the front end 16 through the middle section 15 and on to the rear end 14, the tapered wall 38 transitions to a non-tapered wall, generally designated 42, that extends to the rear end 14 and defines a rear portion of the inner feature 30. As illustrated, the inner feature 30 is relatively thick near the front end 16, thus defining a relatively small opening 40. Alternatively, the inner wall 38 may be conical in shape, ramped in shape and/or narrowing in shape.

Referring to FIGS. 1-6 and 8, the housing 12 includes a series of slots, keyways dovetails or other prismatic feature, that provides a means of allowing the inserts to follow the tapered wall 38 as the ram moves back and forth 44, positioned at various locations about the front section 16 of the housing 12. The housing 12 preferably includes four slots 44 equally spaced from one another, positioned around the front section 16, however more or less slots 44 may be employed as desired. As depicted, the slots 44 extend through the entire width of the tapered wall 38, and have orientation wherein the slots 44 vary in width as they extend from outside the housing 12, through the wall 38 into the inner feature 30. Specifically, the slots 44 have a first and second portions, 46 and 48 respectively, wherein the first portion 46 opens to the "outside" of the housing 12 and has a first width, while the second portion 48 opens to the inner feature 30 and has a second, smaller width.

As illustrated in FIGS. 1-4 and 7, the housing 12 is comprised of two sections or pieces, a top section or clam shell section 50 also referred to as a first half-sleeve and a bottom section 52 also referred to as a second half-sleeve. The top 50 and bottom 52 sections are hingedly connected to one another via a standard hinge attachment 54. The clam shell section 50 swivels upwardly, away from the bottom section 52 as indicated in FIG. 4. The clam shell section 50 preferably has a hole through it that aids in the opening and closing of the clam shell section 50. While the hole is preferred, it is not required for proper function of the clam shell section 50. While the figures depict a "right-handed" swivel arrangement between the clam shell section 50 and the bottom section 52, alternative embodiments of the quick gripping apparatus 10 may include "left-handed" swivel arrangements between the clam shell section 50 and the bottom portion 52. The housing 12 also includes an elevated stop or elevated stop block 56. As illustrated in FIG. 4, the stop block 56 includes a screw 58 that retains the stop block 56 within the slot or groove 60. The stop block 56 functions to prevent the claim shell section 52 from having a full seat against the bottom section 52 of the housing 12.

Referring now to FIGS. 1-4 and 7, the rings 18, 20 and 22 encircle the housing 12 of the quick change gripping apparatus 10. Though rings are depicted in FIGS. 1-4 and 7, alternative embodiments of the gripping apparatus 10 may include collars, first half shell retainers, second half shell retainers or means for retaining. As depicted in the figures, each ring 18, 20 and 22 includes a plurality of holes, openings, slots or indentations 62 into which the handles 26 are inserted. As illustrated in FIG. 7, the handles 26 have pegs and/or dowels 64 that removably insert into the holes, indentations, slots or openings 62 to form a temporary friction fit attachment. The handles 26 function to assist in translating or sliding the front ring 20 and rear ring 18 along the housing 12.

The retainer ring 22, as depicted in FIGS. 1-3 and 5 and 6, functions to attach and/or retain the entire quick change gripping apparatus 10 to a stretch form machine or the like. The retainer ring 22 preferably includes internal threads to provide attachment of the quick change gripping apparatus 10 to a stretch form machine or the like via threaded attachment. The apparatus 10 may alternatively be connected to a stretch machine without the use of a retainer ring, for example, weld attachment and/or bolt attachment may be employed.

The rear ring 18, like the retainer ring 22 encircles the housing 12, however the rear ring 18 slidably engages the housing 12 such that it slides or translates along the housing between the retainer ring 18 and the rear stops 36. The rear ring 18 functions to assist the front ring 20, which will be discussed in further detail below, in keeping the clam shell section 50 and bottom portion 52 of the housing closed during operation of the apparatus 10.

The front ring 20, like the rear ring 18, encircles the housing 12 and slidably engages the housing 12. The front ring 20 includes detents 66 spaced apart about the inside of the front ring 20 such that the spacing corresponds with that of the rear stops 36. These detents 66 allow for the front ring 20 to clear the rear stops 36 during translation of the ring 20, enabling the rear ring to slide or translate almost the entire length of the housing 12, between the rear ring 22 and the front stops 34. As previously mentioned, the front ring 20 combines with the rear ring 18 to keep the clam shell section 50 and bottom portion 52 of the housing closed during operation of the apparatus 10.

Referring now to FIGS. 9 and 10, a ram extension 28 is illustrated having an annular groove 68 and an internal bore 70. The ram extension is preferably cylindrical in shape and orientation such that it compliments the inner angular feature 30 of the housing 12. For purposes of clarity, independent front and side views of the ram extension 28 are illustrated in FIGS. 9 and 10, however during operation of the gripping apparatus 10, the ram extension 28 is disposed within the inner feature 30 of the housing 12, behind the jaw inserts 24. The ram extension 28 connects to an inner hydraulic ram 69 through the internal bore 70 via a screw 71, as illustrated in the front view depicted in FIG. 7 and in FIG. 9. The ram extension 28 functions to connect the jaw inserts 24 to the inner hydraulic ram 69 of a stretch form machine or the like.

Now, referring back to FIGS. 1-4 and 8, the jaw inserts 24 are positioned within the inner, angular feature 30 of the housing 12, and the apparatus typically employs four inserts 24. However, alternatively, more or less inserts may be employed depending on the profile and/shape of the workpiece to be stretched. Each jaw insert 24 includes a ram interlocking feature 72, that includes an annular lip or groove, for example, a generally L-shaped finger, that extends from the back of the insert 24 that engages the annular groove 68 of the ram extension. The inserts 24 are preferably inserted or positioned in the inner feature 30 of the housing 12, vertically, one at time. During insertion, the jaw insert 24 is placed in the inner feature 30 so that the L-shaped finger 72 engages the annular groove 68 of the ram extension 28. The jaw insert 24 is then rotated clockwise in preparation for placement of the next insert 24. These steps are repeated for each insert 24 used in the apparatus 10. During operation of the gripping apparatus 10, the insertion of the L-shaped finger 72 into the annular groove 68 provides positive disengagement of the jaw inserts 24 from the workpiece when retracted.

Each jaw insert also includes a notch or hole 74 that aligns with one of the slots 44 in the front end 16 of the housing 16. As illustrated in FIGS. 5 and 6, during operation of the gripping apparatus 10, screws or other attachment or engaging means 76, such as bolt, are disposed within each of the slots 44 and extend through the slot 44 to engage the notches 74. The screws 76 combine with washers 78 to retain the individual jaw inserts 24 within the inner feature 30 of the housing 12. The screws 76 and slots 44 also combine to provide the positive disengagement of the jaw inserts 24, as previously described.

The jaw inserts 24 are preferably made of kirksite, however alternative materials my be used if desired. The shape of the jaw inserts 24 is relative to the profile or shape of the workpiece to be stretched. Also the jaw inserts 24 combine to match the profile or shape of the workpiece to be grasped and stretched. The jaw inserts may combine match workpiece profiles or cross-sections such as flat stock, angles, "C" channels, I or H, J, Hat and/or Z. For example, if the workpiece has an I-beam shape in cross-section, then the jaw inserts 24 combine together to form at their adjoining surfaces an I-beam shaped space, into which an end of the workpiece is placed. As illustrated in the figures, the outer walls of the individual inserts 24 compliment the tapered wall 38 of the inner feature 30 and are accordingly tapered. When combined, the jaw inserts 24 provide a single, cylindrical jaw insert 80, that is tapered in accordance with the inner feature 30, that grips or grasps the workpiece to be stretched.

During operation of the quick change gripping apparatus 10, the apparatus is connected to a stretch form machine, such as a Stress Wrap Press by Missouri Metals, Stress Forming Machine by The Cyril Bath Company or a Stretch Forming Machine by Hufford, via the retainer ring 22. The aforementioned connection includes the connection of the ram extension 28 to an inner hydraulic ram of the stretch form machine, and the connection also includes the connection of the housing 12 to an outer hydraulic ram of the stretch form machine. The jaw inserts 24 are placed in the inner feature 30 of the housing 12 as previously described, and the clam shell section 50 is closed from the position illustrated in FIG. 4 to the positioned illustrated in FIG. 3.

Figure 2:
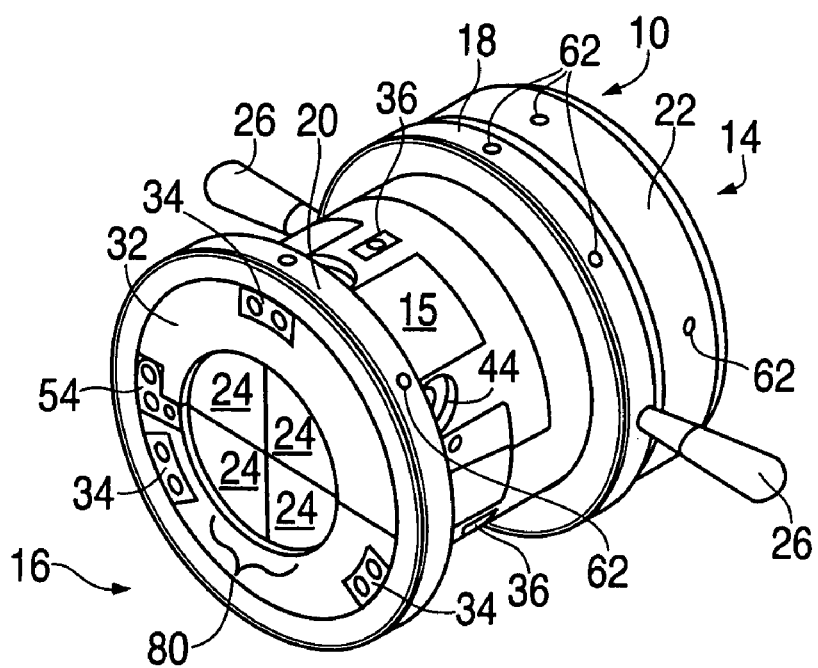
FIG. 2 is an isometric view of the quick change gripping apparatus transitioning from the operational position as illustrated in FIG. 1, to an non-operational position, in accordance with an embodiment.

Next, the front and rear rings 18, 20 are translated or slid forward using the handles 26, from the position illustrated in FIG. 2 to that illustrated in FIG. 1, into the operational position. The front ring 20 is translated forward first by inserting at least one, and preferably two, of the handles 26, each into any one of the holes 62 located on the front ring 20. The ring 20 is then translated along the housing 12 until it abuts the front stops 34. Once the front ring 20 is moved into the operational position, the rear ring 18 is translated forward using the handles 26, in similar fashion to that of the front ring 20, until the ring 18 is stopped by the rear stops 36. The quick change gripping apparatus 10 is now in the operational position shown in FIG. 1.

Once the apparatus 10 is in the operational position, a workpiece to be stretched is inserted into jaw inserts 24 which combine to form the jaw 80. A force is next applied to the jaw inserts 24 in a forward, first direction, by the inner hydraulic ram via the ram extension 28. This force causes the inserts 24 to be pushed forward toward one another and wedged against the tapered wall 38 of the inner feature 30. This "wedging movement" of the jaw inserts 24 causes the inserts 24 to exert a clamping or grasping pressure on the workpiece, providing a secure grip on the workpiece. While the inner hydraulic ram is applying a pushing force in the forward, first direction, the outer hydraulic ram simultaneously applies a pulling force in a second, opposite direction to the housing 12, causing the workpiece to be stretched.

Once the forming operation is completed, the force applied to both the jaw inserts 24 and the housing 12 by the inner hydraulic ram and outer hydraulic ram, respectively, is released. The aforementioned releasing of the applied force releases the "wedging effect" of the jaw inserts 24 against the tapered wall 38, and permits expansion of the jaw inserts 24 away from one another, releasing the clamping pressure exerted on the workpiece.

A new stretching operation may be conducted on a new workpiece that has the same profile by simply inserting the new workpiece into the jaw 80 and carrying out the steps as described above. Alternatively, other workpieces having varying profiles be stretched formed by transitioning the apparatus 10 from the operation position as depicted in FIG. 1, to the non-operational position as illustrated in FIG. 4. This is accomplished by first, sliding the front and rear rings 20, 18 back into their non-operational positions as illustrated in FIG. 3. Next, the clam shell section 50 is opened, as illustrated in FIG. 4. The jaw inserts 24 now may be exchanged with ones which correspond to the profile of the new workpiece to be stretch formed. The gripping apparatus 10 may then be returned to the operational position through the steps previously described.

Figure 11:
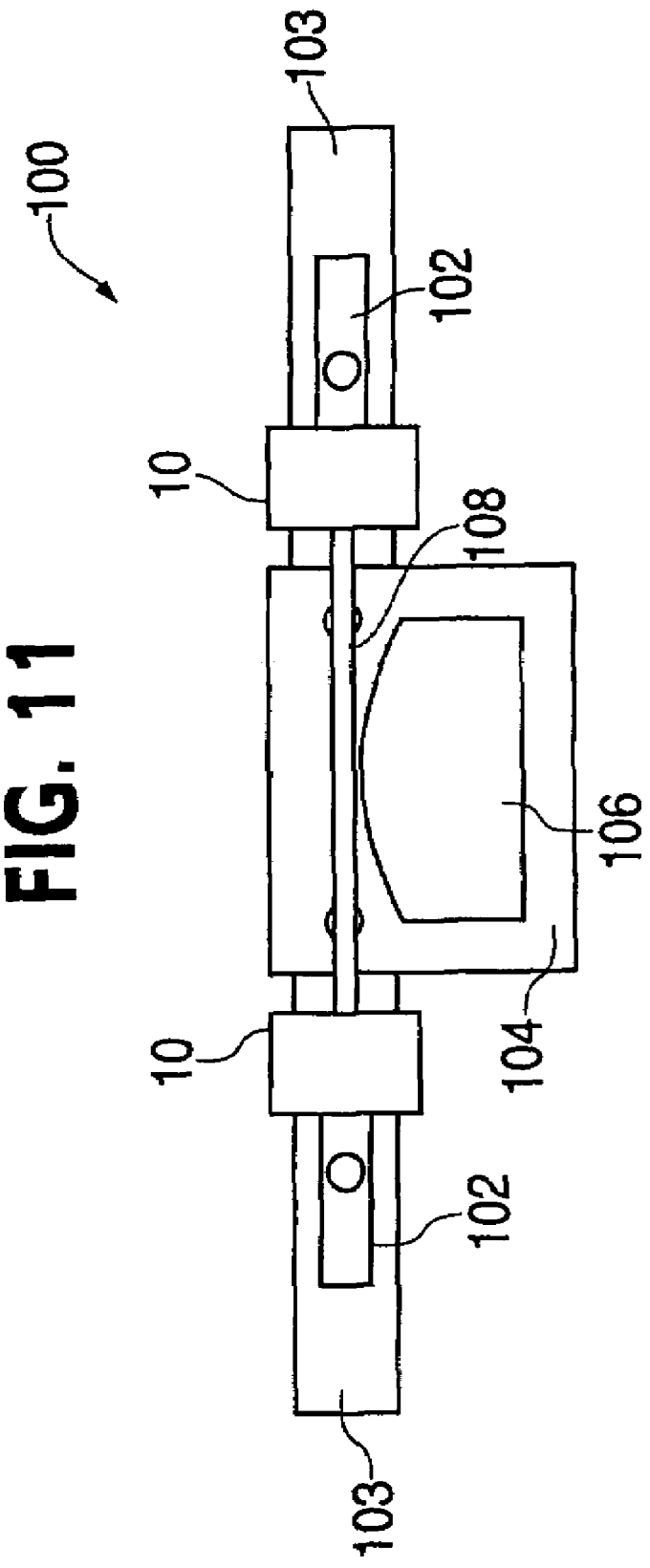
FIG. 11 is a schematic view of a stretch form machine combination employing quick change gripping apparatuses in accordance with an embodiment.

Referring now to FIG. 11, a schematic view of a stretch form machine, generally designated 100, which employs two quick change gripping apparatuses 10 as previously described in connection with FIGS. 1-10. The stretch form machine 100 includes two opposing swing arms 102 wherein each swing arm 102 is attached to the quick change apparatuses 10. The swing arms 102 connect to the inner and outer hydraulic rams, generally designated 103, of the stretch form machine 100. The stretch machine further includes a press table 104 upon which a press die 106 rests. FIG. 11 also depicts a workpiece 108 to be stretch formed, that is retained by the gripping apparatuses 10.

As described above, the quick change gripping apparatus 10 may be utilized in conjunction with a stretch form machine to form or manufacture components and/or parts such as aerospace components and/or parts. For example, the stretch form machine 100, in conjunction with the quick change apparatuses 10, may be utilized to manufacture aerospace components such as stringers. Stringers typically extend the length of the fuselage of an airplane, and/or extend the around the circumference of the fuselage. The stringers function to "string" or connect the various body panels of the fuselage together. The quick change gripping apparatus 10, in combination with a stretch form machine 100 similar to that illustrated in FIG. 11, may be used in stretch extrusion processes, for example, to manufacture stringers or the like. During the stretch extrusion process, the stretch form machine 100 employs the quick grip apparatuses 10 as previously described, to stretch form a stringer component to conform to a desired surface or contour.

The many features and advantages of the embodiments are apparent from the detailed specification, and thus, it is intended by the appended claims to cover all such features and advantages of the embodiments which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the various embodiments.

What is claimed is:

1. A quick change gripping apparatus for gripping a workpiece having a profile, comprising:
   a housing having a first end and a second end wherein said housing comprises:
      an inner, angular feature having a tapered wall, wherein said inner feature extends at least partially between said first end and said second end;
      a first half shell rigidly affixed to said inner feature; and
      a second half shell pivotally connected to said first half shell and pivotal between an open position and a closed position;
   a first collar slidably disposed around said housing at a first axial location thereof, wherein said first collar translates a first distance along said housing
   a first jaw insert positioned within said inner feature of said housing; and
   a second jaw insert positioned within said inner feature of said housing,
   wherein said first half shell and said second half shell surround said jaw inserts when in the closed position.

2. The quick change gripping apparatus according to claim 1, further comprising:
   a second collar slidably disposed around said housing at a second axial location thereof, wherein said second collar translates a second distance along said housing; and
   a means for attaching the quick change apparatus to a machine tool.

3. The quick change gripping apparatus according to claim 1, further comprising:
   a third jaw insert positioned within said inner feature of said housing; and
   a fourth jaw insert positioned within said inner feature of said housing,
   wherein said first, second, third and fourth jaw inserts combine to form an insert profile corresponding to the workpiece profile.

4. The quick change gripping apparatus according to claim 1, further comprising a ram extension disposed within said inner feature, wherein said first jaw insert comprises a means for engaging said ram extension and said second jaw insert comprises said means for engaging said ram extension.

5. The quick change gripping apparatus according to claim 4, wherein said means for engaging said ram extension is a L-shaped finger.

6. The quick change gripping apparatus according to claim 5, further comprising a ram extension having an annular groove and an inner bore, disposed within said inner feature, wherein said ram extension engages said first jaw insert and said second jaw insert via said L-shaped finger and said annular groove.

7. The quick change gripping apparatus according to claim 1, further comprising at least one means for retaining said first collar disposed on said housing at a second axial location thereof, wherein said first collar translates at least partially between said second end and said at least one means for retaining said first collar.

8. The quick change gripping apparatus according to claim 2, further comprising at least one means for retaining said second collar disposed on said housing at a fifth axial location thereof, wherein said second collar translates at least partially between said third collar and said at least one means for retaining said second collar.

9. The quick change gripping apparatus according to claim 7, wherein said at least one means for retaining said first collar is three means for retaining said first collar, wherein said three means for retaining said first collar are disposed on said housing at said fourth axial location equally spaced apart from one another.

10. The quick change gripping apparatus according to claim 8, wherein said at least one means for retaining said second collar is three means for retaining said second collar, wherein said three means for retaining said second collar are disposed on said housing at said fifth axial location equally spaced apart from one another.

11. The quick change gripping apparatus according to claim 2, wherein said first and second collars each comprise a plurality of openings disposed along each of said first and second collars.

12. The quick change gripping apparatus according to claim 2, further comprising:
    a first handle extending from at least one of said first and second collars; and
    a second handle extending from at least one of said first and second collars.

13. The quick change gripping apparatus according to claim 1, further comprising:
    a first notch disposed on said first jaw insert;

a second notch disposed on said second jaw insert;

a first keyway disposed on said housing, wherein said first keyway extends through said tapered wall and is aligned with said first notch; and a second keyway disposed on said housing, wherein said second keyway extends through said tapered wall and is aligned with said second notch.

14. The quick change gripping apparatus according to claim 3, further comprising:

a third notch disposed on said third jaw insert;

a fourth notch disposed on said fourth jaw insert;

a third keyway disposed on said housing, wherein said third keyway extends through said tapered wall and is aligned with said first notch; and a fourth keyway disposed on said housing, wherein said fourth keyway extends through said tapered wall and is aligned with said second notch.

15. The quick change gripping apparatus according to claim 13, further comprising a first engaging means extending through said first and second keyways to engage said first and second notches, wherein said first engaging means retain the positioning of said first and second jaw inserts within said inner feature.

16. The quick change gripping apparatus according to claim 14, further comprising a second engaging means extending through said third and fourth keyways to engage said third and fourth notches, wherein said second engaging means retain the positioning of said first and second jaw inserts within said inner feature.

17. A method for gripping a workpiece using gripping apparatus, comprising:

inserting a workpiece to be into the gripping apparatus, wherein the gripping apparatus comprises:

a first jaw insert and a second jaw insert disposed within a cylindrical housing having a first end and a second end wherein the cylindrical housing comprises:

an inner feature having a tapered wall, wherein said tapered wall extends at least partially between the first end and the second end;

a first shell rigidly affixed to the inner feature;

a second half shell pivotally connected to the first half shell;

a first collar slidably disposed around the cylindrical housing at a first axial location thereof; and a second collar slidably disposed around the cylindrical housing at a second axial location thereof;

applying a pushing force in a first direction to the first and second jaw inserts, wherein said step of applying a pushing force causes the first and second jaw inserts to wedge against the tapered wall; and trapping the workpiece between the first and second jaw inserts.

18. The method according to claim 17, further comprising the step of applying a pulling force in a second, opposite direction to the cylindrical housing.

19. A method for gripping a workpiece using a gripping apparatus, composing:

inserting a first jaw insert and a second jaw insert into a housing having a first end and a second end wherein the housing comprises an inner feature having a tapered wall, wherein said tapered wall extends at least partially between the first end and the second end; a first half shell rigidly affixed to the inner feature; a second half shell pivotally connected to the first half shell; a first collar slidably disposed around the housing at a first axial location thereof; a second collar disposed around the housing at a second axial location thereof;

closing the clam shell section;

translating the first collar a first direction along the housing until it abuts a first stop;

translating the second collar in the first direction along the housing until it abuts a second stop;

applying a pushing force in the first direction to the first and second jaw inserts, wherein said step of applying a pushing force causes the first and second jaw inserts to wedge against the tapered wall; and trapping the workpiece between the first and second jaw inserts.

20. The method according to claim 19, further comprising the steps of:

translating the second collar in a second, opposite direction;

translating the first collar in the second, opposite direction;

opening the second half shell; and exchanging the first and second jaw inserts.

21. A stretch form machine for stretch forming a workpiece, comprising:

an inner hydraulic drive;

an outer hydraulic drive; and a first quick change gripping apparatus to grip the workpiece, said first quick change apparatus comprising:

a housing having a first end and a second end wherein said housing comprises; an inner, angular feature having a tapered wall, wherein said inner feature extends at least partially between said first end and said second end; a first half shell section; and a second half shell section hingedly connected to said first half shell section;

a first collar having a circumference slidably disposed around said housing at a first axial location thereof, wherein said first collar translates a first distance along said housing; and a plurality of jaw inserts positioned within said inner, angular feature of said housing.

22. The stretch form machine according to claim 21, further comprising:

a first jaw insert positioned within said inner, angular feature of said housing;

a second jaw insert positioned within said inner feature of said housing;

a third jaw insert positioned within said inner feature of said housing; and a fourth jaw insert positioned within said inner feature of said housing.

* * * * *

UNITED STATES PATENT AND TRADEMARK OFFICE
CERTIFICATE OF CORRECTION

PATENT NO. : 7,290,425 B2
APPLICATION NO. : 11/111875
DATED : November 6, 2007
INVENTOR(S) : Craig E. Taylor It is certified that error appears in the above-identified patent and that said Letters Patent is hereby corrected as shown below:

Col. 11 Claim 19, line 2:
Please replace "composing:" with --comprising:--.

Signed and Sealed this

Fourth Day of March, 2008

JON W. DUDAS
*Director of the United States Patent and Trademark Office*